US008836970B2

(12) United States Patent
Barclay et al.

(10) Patent No.: US 8,836,970 B2
(45) Date of Patent: Sep. 16, 2014

(54) DOCUMENT PRINTING TECHNIQUES

(75) Inventors: Duncan Barclay, Cambridge (GB);
William Reeves, Cambridge (GB);
Henning Sirringhaus, Coton (GB)

(73) Assignee: Plastic Logic Limited, Cambridge, Cambridgeshire (GB)

( * ) Notice: Subject to any disclaimer, the term of this patent is extended or adjusted under 35 U.S.C. 154(b) by 959 days.

(21) Appl. No.: 12/138,967

(22) Filed: Jun. 13, 2008

(65) Prior Publication Data

US 2009/0109468 A1    Apr. 30, 2009

(30) Foreign Application Priority Data

Oct. 24, 2007  (GB) .................................. 0720764.0
Oct. 24, 2007  (GB) .................................. 0720843.2
Feb. 15, 2008  (GB) .................................. 0802818.5

(51) Int. Cl.
| G06F 3/12 | (2006.01) |
| G06F 3/0354 | (2013.01) |
| G06F 3/041 | (2006.01) |
| G06F 3/147 | (2006.01) |
| G02F 1/167 | (2006.01) |
| G02F 1/1333 | (2006.01) |

(52) U.S. Cl.
CPC ............ G06F 3/041 (2013.01); G06F 3/03547 (2013.01); G09G 2340/04 (2013.01); G09G 2380/14 (2013.01); G02F 1/167 (2013.01); G02F 2001/133388 (2013.01); G06F 3/147 (2013.01); G09G 2340/0407 (2013.01); G09G 2310/0232 (2013.01)
USPC ....................................................... 358/1.15

(58) Field of Classification Search
USPC ........ 358/1.15, 1.1, 1.16, 1.18; 715/200, 247, 715/273, 253; 345/173, 53, 45, 467, 581, 345/619, 660, 169
See application file for complete search history.

(56) References Cited

U.S. PATENT DOCUMENTS

| 4,453,200 A | 6/1984 | Treka et al. |
| 4,855,725 A | 8/1989 | Fernandez |

(Continued)

FOREIGN PATENT DOCUMENTS

| EP | 0 283 235 | 9/1988 |
| EP | 1 308 825 | 5/2003 |

(Continued)

OTHER PUBLICATIONS

International Search Report; GB 0802818.5; J. McCann; May 29, 2008.

(Continued)

*Primary Examiner* — Mark Zimmerman
*Assistant Examiner* — Lawrence Wills
(74) *Attorney, Agent, or Firm* — Fish & Richardson P.C.

(57) ABSTRACT

We describe a portable paperless electronic printer for displaying a printed document on an electronic paper display. The paperless electronic printer includes an input to receive print data from an output of a printer driver of a computerised electronic device, a non-volatile electrophoretic display to provide an electronic paper display of stored said print data for a said document page to mimic said document page when printed on paper; and a processor coupled to said input, to non-volatile memory, and to said non-volatile electrophoretic display and configured to input said print data, to store said data derived from said print data in said non-volatile memory, and to provide to said non-volatile electrophoretic display data for displaying a said document page derived from said stored data.

15 Claims, 8 Drawing Sheets

(56) References Cited

U.S. PATENT DOCUMENTS

| | | | |
|---|---|---|---|
| 4,856,088 A | 8/1989 | Oliwa et al. | |
| 5,063,600 A * | 11/1991 | Norwood | 382/186 |
| 5,347,630 A | 9/1994 | Ishizawa et al. | |
| 5,377,099 A | 12/1994 | Miyagawa | |
| 5,454,066 A * | 9/1995 | Tsai | 358/1.6 |
| 5,585,612 A | 12/1996 | Harp, Jr. | |
| 5,696,982 A | 12/1997 | Tanigawa et al. | |
| 5,754,873 A * | 5/1998 | Nolan | 715/235 |
| 5,760,323 A | 6/1998 | Romero | |
| 5,784,487 A | 7/1998 | Cooperman | |
| 5,857,157 A | 1/1999 | Shindo | |
| 5,875,432 A | 2/1999 | Sehr | |
| 5,943,679 A | 8/1999 | Niles et al. | |
| 5,956,034 A | 9/1999 | Sachs | |
| 6,092,051 A | 7/2000 | Killan et al. | |
| 6,248,483 B1 | 6/2001 | Aylward et al. | |
| 6,297,945 B1 | 10/2001 | Yamamoto | |
| 6,388,877 B1 | 5/2002 | Canova, Jr. et al. | |
| 6,456,732 B1 | 9/2002 | Kimbell | |
| 6,661,920 B1 | 12/2003 | Skinner | |
| 6,831,662 B1 | 12/2004 | Lum et al. | |
| 6,888,643 B1 | 5/2005 | Grimes | |
| 6,919,678 B2 | 7/2005 | Ozolins et al. | |
| 6,919,879 B2 | 7/2005 | Griffin et al. | |
| 6,954,213 B1 | 10/2005 | Hidaka et al. | |
| 6,961,029 B1 | 11/2005 | Canova, Jr. et al. | |
| 6,965,375 B1 | 11/2005 | Gettemy et al. | |
| 7,010,571 B1 | 3/2006 | Quatrano et al. | |
| 7,058,829 B2 | 6/2006 | Hamilton | |
| 7,079,111 B2 | 7/2006 | Ho | |
| 7,103,848 B2 | 9/2006 | Barsness et al. | |
| 7,283,142 B2 | 10/2007 | Credelle et al. | |
| 7,289,084 B2 | 10/2007 | Lesniak | |
| 7,412,647 B2 * | 8/2008 | Sellers et al. | 715/253 |
| 7,425,970 B1 * | 9/2008 | Gettemy et al. | 345/698 |
| 7,656,393 B2 | 2/2010 | King et al. | |
| 7,698,647 B2 | 4/2010 | Streeb et al. | |
| 7,748,634 B1 | 7/2010 | Zehr | |
| 7,760,956 B2 | 7/2010 | Lin et al. | |
| 7,912,829 B1 | 3/2011 | Mathes et al. | |
| 7,966,557 B2 | 6/2011 | Shagam et al. | |
| 8,116,788 B2 | 2/2012 | Sarkissian et al. | |
| 8,126,845 B2 | 2/2012 | Freedman | |
| 2002/0018027 A1 | 2/2002 | Sugimoto | |
| 2002/0102866 A1 | 8/2002 | Lubowicki | |
| 2002/0149572 A1 | 10/2002 | Schultz | |
| 2002/0154120 A1 | 10/2002 | Cullimore et al. | |
| 2002/0169893 A1 | 11/2002 | Chen et al. | |
| 2003/0067427 A1 | 4/2003 | Comiskey et al. | |
| 2003/0140102 A1 | 7/2003 | Takeuchi et al. | |
| 2003/0227441 A1 | 12/2003 | Hioki et al. | |
| 2004/0008398 A1 | 1/2004 | Amundson | |
| 2004/0212588 A1 | 10/2004 | Moriyama | |
| 2004/0255244 A1 | 12/2004 | Filner et al. | |
| 2004/0268004 A1 | 12/2004 | Oakley | |
| 2005/0025387 A1 | 2/2005 | Luo | |
| 2005/0071364 A1 | 3/2005 | Xie | |
| 2005/0206580 A1 | 9/2005 | Koyama | |
| 2005/0237444 A1 | 10/2005 | You | |
| 2005/0257143 A1 | 11/2005 | Lewis | |
| 2006/0026536 A1 | 2/2006 | Hotelling et al. | |
| 2006/0029250 A1 | 2/2006 | Kariki | |
| 2006/0274549 A1 | 12/2006 | Fukuyoshi | |
| 2007/0024603 A1 | 2/2007 | Li | |
| 2007/0028086 A1 | 2/2007 | Oshima et al. | |
| 2007/0058178 A1 | 3/2007 | Kurihara et al. | |
| 2007/0115258 A1 | 5/2007 | Cupps et al. | |
| 2007/0195009 A1 | 8/2007 | Yamamoto et al. | |
| 2008/0235224 A1 | 9/2008 | Rodrigues et al. | |
| 2008/0238871 A1 | 10/2008 | Tam | |
| 2008/0297470 A1 | 12/2008 | Marsh et al. | |
| 2008/0297496 A1 | 12/2008 | Watson et al. | |
| 2008/0298083 A1 | 12/2008 | Watson et al. | |
| 2009/0109185 A1 * | 4/2009 | Barclay et al. | 345/173 |
| 2009/0109468 A1 | 4/2009 | Barclay et al. | |
| 2009/0109498 A1 * | 4/2009 | Barclay et al. | 358/474 |
| 2009/0113291 A1 * | 4/2009 | Barclay et al. | 715/243 |
| 2009/0113307 A1 | 4/2009 | MacKenzie | |
| 2009/0157847 A1 | 6/2009 | Shibata | |
| 2009/0219271 A1 | 9/2009 | Bandel et al. | |
| 2010/0295812 A1 | 11/2010 | Burns et al. | |
| 2011/0113150 A1 | 5/2011 | Munnery et al. | |

FOREIGN PATENT DOCUMENTS

| | | |
|---|---|---|
| GB | 2 214 342 | 8/1989 |
| GB | 2 446 499 | 8/2008 |
| GB | 2 446 500 | 8/2008 |
| GB | 2 454 032 | 4/2009 |
| GB | 2 454 033 | 4/2009 |
| JP | 10-027162 | 1/1998 |
| JP | 2005266968 | 9/2005 |
| JP | 2005274832 | 10/2005 |
| JP | 2006/065240 | 3/2006 |
| WO | 97/04398 | 2/1997 |
| WO | 02/095555 | 11/2002 |
| WO | 03/017245 | 2/2003 |
| WO | 03/044765 | 5/2003 |
| WO | 2004/008308 | 1/2004 |
| WO | 2004/114259 | 12/2004 |
| WO | 2006/031347 | 3/2006 |
| WO | 2006/087415 | 8/2006 |
| WO | 2007/073584 | 7/2007 |
| WO | 2009/053738 | 4/2009 |
| WO | 2009/053740 | 4/2009 |
| WO | 2009/053743 | 4/2009 |
| WO | 2009/053747 | 4/2009 |

OTHER PUBLICATIONS www.palm.com; Palm Z22,TIand Tungsten E2 handhelds.
International Search Report; GB0801998.6; D. Maskery; May 28, 2008.
Search Report; GB 0802011.7; R. Jenkins; Jun. 18, 2008.
IDDO Genuth: "the Future of Electronic Paper" [Online]; Oct. 15, 2007, XP002513292; http://thefutureofthings.com/articles/1000/the-future-of-electronic-paper.html.
International Search Report; PCT/GB2008/050980; Feb. 23, 2009; E. Maciu.
International Search Report; GB 0802816.9; J. McCann; May 23, 2008.
International Search Report; PCT/GB2008/050977; Feb. 19, 2009; E. Maciu.
Search Report; GB0802820.1; R. Jenkins; Sep. 12, 2008.
Search Report; PCT/GB2008/050985 (Feb. 23, 2009.
USPTO Office Action in U.S. Appl. No. 12/027,176, mailed Jun. 4, 2009, 12 pages.
Search Report; GB 0801987.9; D. Maskery; May 19, 2008.
Search Report and Examiner Letter for Application No. GB0802011.7 (dated Aug. 27, 2009).
EP Communication; Appln. No. 08 841 371.1; Mar. 23, 2011.
www.palm.com, Palm Z22, T/X, and Tungsten E2 handhelds (copyright 2005).
International Application No. PCT/GB2008/050975; International Preliminary Report on Patentability (May 6, 2010).
International Search Report; PCT/GB2008/050975; Feb. 20, 2009; E. Maciu.
Microsoft Office Word 2003 Inside Out, Author Millholion and Murray, Nov. 12, 2003; pp. 434-441.
Communication pursuant to Article 94(3) EPC; EP Application No. 08 806 787.1-1228; dated Mar. 23, 2011 (8 pages).
Patents Act 1977: Examination report under section 18(3); GB Application No. 0802805.2; dated Sep. 8, 2011 (3 pages).
Communication pursuant to Article 94(3) EPC; EP Application No. 08 841 838.9-1228; dated Mar. 23, 2011 (8 pages).
Patents Act 1977: Examination report under section 18(3); GB Application No. 0802816.9; dated Sep. 8, 2011 (3 pages).
Detailed First Office Action; CN Application No. 200880121962.5; dated Jul. 19, 2011 (6 pages).

(56) References Cited

OTHER PUBLICATIONS

Communication pursuant to Article 94(3) EPC; EP Application No. 08 806 792.1-1228; dated Mar. 23, 2011 (7 pages).
Patents Act 1977: Examination report under section 18(3); GB Application No. 0802815.1; dated Sep. 8, 2011 (4 pages).
Communication pursuant to Article 94(3) EPC; EP Application No. 08 841 371.1-1228; dated Mar. 23, 2011 (8 pages).
Patents Act 1977: Examination report under section 18(3); GB Application No. 0802818.5; dated Sep. 8, 2011 (3 pages).
Detailed First Office Action; CN Application No. 2008801224197; received Oct. 17, 2011; 6 pp [Translation].
Text of the First Office Action; CN Application No. 200880122418.2; received Oct. 27, 2011; 5 pp. [Translation].
Baker, "Cropping and Rotating Pages in Acrobat," www.planetpdf.com: Creative & Print: Tips & Tricks; 2 pages, Apr. 7, 2004.
Examination Report in European application No. EP0802816.9, 4 pages, dated Jan. 16, 2012.
Examination Report in European application No. EP0802815.1, 4 pages, dated Jan. 16, 2012.
Examination Report in European application No. EP0802818.5, 4 pages, dated Jan. 16, 2012.
Office Action in Chinese application No. CN200880122420, 6 pages of translation, received Jan. 25, 2012.
Office Action in Chinese application No. CN200880122419.7, issued on Aug. 31, 2012, with full translation, 40 pages.
Examination Report in British application No. GB0802815.1, dated Jun. 25, 2012, 5 pages.
Examination Report in British application No. GB0802816.9, dated Jun. 25, 2012, 3 pages.
Examination Report in British application No. GB0802818.5, dated Jun. 26, 2012, 3 pages.
Millhollon et al., "Microsoft Office Word 2003 Inside Out," Microsoft Press, pp. 434-441, Nov. 12, 2003.
Office Action in U.S. Appl. No. 12/138,748, dated Mar. 6, 2012, 24 pages.
Office Action in U.S. Appl. No. 12/138,810, dated Apr. 25, 2012, 14 pages.
Office Action in U.S. Appl. No. 12/138,835, dated Jul. 23, 2012, 18 pages.
Piotr A, "Crop PDF without Adobe Acrobat and of course . . . on Unix" Bloger internet blog, posted Jan. 19, 2007, 2 pages, (http://ilikeunix.blogspot.co.uk/2007/01/crop-pdf-without-adobe-acrobat-and-of.html).
Office Action in Chinese application No. CN2008801224182.2, issued on Mar. 19, 2013, with full translation, 27 pages.
"PDF files: dark background", Experts-Exchange.com, [accessed on May 3, 2012], 6 pages, (http://www.experts-exchange.com/Web_Development/Document_Imaging/Adobe_Acrobat/Q_21537721.html).
Examination Report in European application No. EP0802805.2, 7 pages, dated May 10, 2012.
Office Action in Chinese application No. CN200880122419.7, 2 pages of translation, received May 22, 2012.

\* cited by examiner

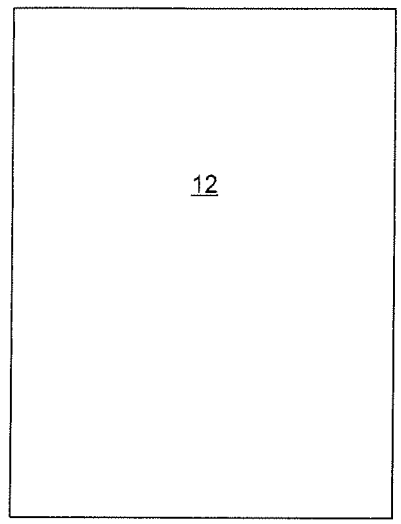
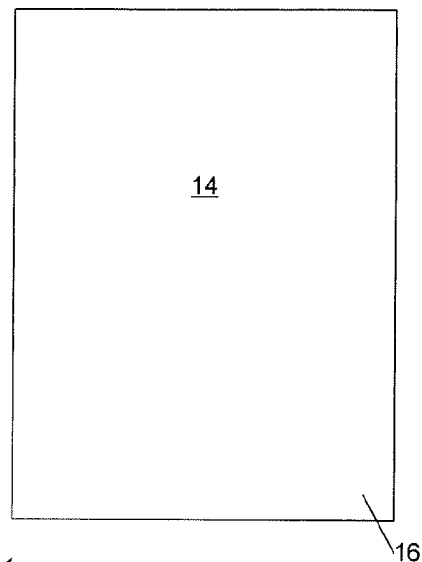
Figure 1a                Figure 1b
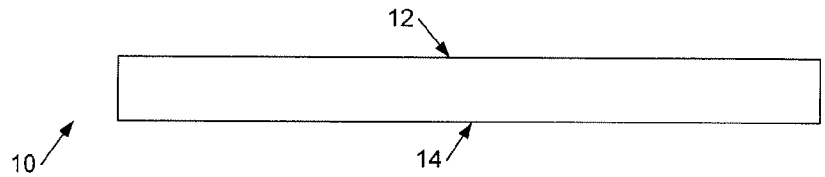
Figure 1c
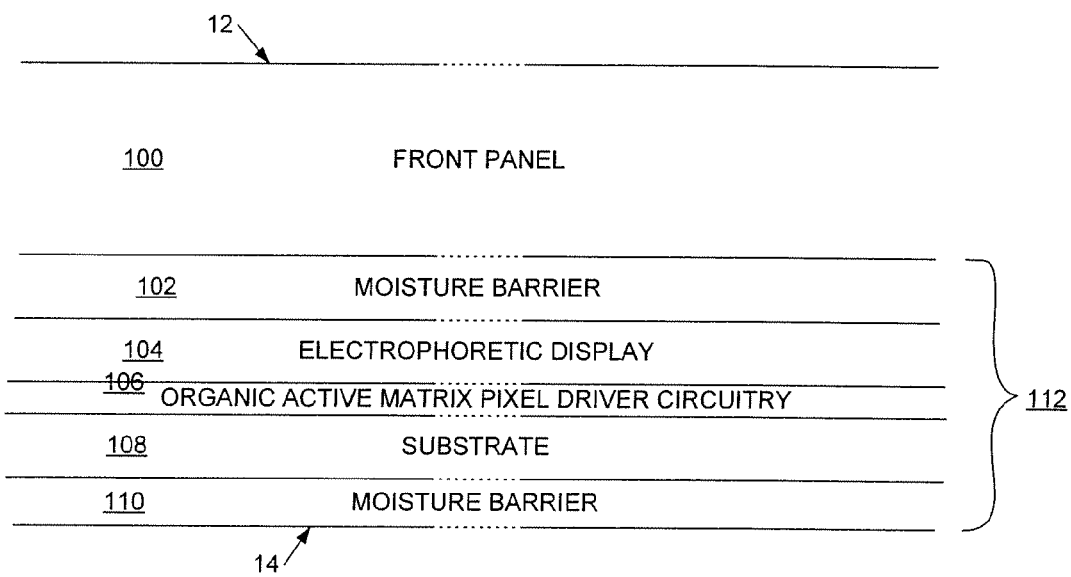
Figure 2

DOCUMENT PRINTING TECHNIQUES

FIELD OF THE INVENTION

This invention relates to a portable paperless electronic printer for displaying a printed document on an electronic paper display.

The application is related to other co-pending US applications filed on the same day by the same assignee, all hereby incorporated by reference in their entirety.

BACKGROUND TO THE INVENTION

We have previously described a form of electronic book in our earlier applications PCT/GB2006/050235 and GB 0702347.6, hereby incorporated by reference.

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, US2005/0151742, and US2006/0119615. Prior art relating to displays can be found in EP0283235A, GB2214342A, and U.S. Pat. No. 6,831,662.

There is, however, a need to improve on such devices.

SUMMARY OF THE INVENTION

According to the present invention there is therefore provided a portable paperless electronic printer for displaying a printed document on an electronic paper display, the paperless electronic printer comprising: an input to receive print data from an output of a printer driver of a computerised electronic device, said print data comprising data for one or more document pages to be printed; non-volatile memory for storing data derived from said print data; a non-volatile reflective display to provide an electronic paper display of stored said print data for a said document page to mimic said document page when printed on paper; and a processor coupled to said input, to said non-volatile memory, and to said non-volatile reflective display and configured to input said print data, to store said data derived from said print data in said non-volatile memory, and to provide to said non-volatile reflective display data for displaying a said document page derived from said stored data.

Broadly speaking embodiments of the printer can be used in the same way as a conventional, paper—based printer (by opening a document and clicking print) a printed page appearing on the display in a manner that mimics paper. Moreover, the device is, in embodiments, portable and battery powered and provides a permanent, paper-like display. In embodiments of the printer, the device is the same size as the apparent size as the document page—that is the same size as a piece of paper if the page had been printed on a conventional printer; moreover in embodiments the printer is thin, light to hold, and has at least some flexibility. Overall the impression of a user is of printed "electronic paper". In embodiments the non-volatile reflective display comprises an electrophoretic display, but this is not essential.

In embodiments of the printer, the device is configured to receive printed data comprising data representing an image of a printed document page (or pages). This may be stored in the non-volatile memory in a, preferably lossless, compressed format.

In embodiments the portable paperless electronic printer comprises an electronic document reading device with an electrophoretic display, arranged to mimic paper. Thus preferred embodiments of the printer comprise an electrophoretic display with a border which is substantially visually matched to the display to give the impression that the display runs up to the edges of the device. In embodiments the "display surface" is flat to edges of the printer. Then, when a page is printed, the margins of the image, that is edge portions of the image of the document page from which information is substantially absent, are cropped and the border of the electrophoretic display gives the impression of these margins when the document page is displayed. In this way the displayed document page, to a viewer, appears to extend substantially to edges or lateral boundaries of the paperless electronic printer.

The printer may have both a portrait orientation and a landscape orientation. In embodiments of the printer the border includes one or more touch sensitive regions and the processor is configured to recognise one or more touch gestures formed on the border irrespective of the orientation of the printer. This again helps to create an overall ease of use similar to that of paper. In embodiments a part or all of the electrophoretic display is touch sensitive and the processor is configured to enable a user to mark up a printed document, for example with a pen. This information may then be stored in the non-volatile memory, for example in association with the document page to which it belongs, in embodiments as a bit map or image. This information may be extracted from the printer and, in some preferred implementations, the printer has a synchronisation function in which printed document pages are received from the computerised (consumer) electronic device and/or in which user annotations are provided back to the computerised electronic device. Preferred embodiments of the printer have a physical size which corresponds to a standard paper size, for example an International standard paper size such as defined in ISO216 (or an equivalent German DIN standard, Swedish SIS standard, or Japanese JIS standard) or a standard North American paper size such as described in ANSI/ASME standard Y14.1 (for example, letter, legal and alike). The printer may have a wired and/or wireless connection to the computerised electronic device.

Use of a printer driver is a particularly convenient technique for paperless electronic printing. However, in the above described invention the printer driver may be replaced by some other form of interface software.

Thus in a related aspect the invention provides a method of printing a document onto an electronic paper display, the method comprising: inputting print data from a printer driver of a computerised electronic device, said print data comprising data for one or more document pages to be printed; storing data derived from said print data in non-volatile memory; reading said data derived from said print data from said non-volatile memory; providing to a non-volatile reflective display document page data for displaying a document page derived from said stored data; and displaying said document page data on said non-volatile reflective display to mimic said document page when printed on paper.

Preferably the document page is displayed, as described above, such that a border of the electrophoretic display is used to "display" a margin of the document page.

In a further related aspect the invention provides an electronic document display device configured as previously described to implement this technique. The border of the electrophoretic display may be used to conceal electrical connections and the like to the electrophoretic display, thus enabling the displayed document page to appear as though it extends right to the edge of the device without needing a programmable display to extend right to the edge of the device.

FURTHER FEATURES OF PREFERRED EMBODIMENTS

We also describe a paperless printer for displaying an electronic document page, the paperless printer comprising a central rewritable portion, a non-rewritable border with external lateral physical dimensions defined by the display edges, wherein the border is coloured to substantially match a background colour of the central rewritable portion such that when a foreground part of the document page is displayed on the central rewritable portion the appearance of margins of the document page is provided by the background coloured border whereby in use the displayed electronic document page appears to extend up to the display edges, and wherein the surface of the display is substantially flat over the lateral physical dimensions from the central rewritable portion across the border to the display edges.

In embodiments the electronic document page has one of a set of predetermined sizes, the information on the page is located in a central portion of the page bordered by the margins, and when the page is displayed on the paperless printer a size of the central portion of the page substantially fits a size of the central rewritable portion of the paperless printer and a width of the non-rewritable border of the paperless printer substantially matches a width of a the margin of the document page. Thus, when the document page is displayed, the appearance of the width of the margin of the document page provided by the background coloured border is substantially in proportion to the size of the central portion of the page.

Preferably the paperless printer includes non-volatile memory storing data defining the information on the central portion of the page and data identifying the size of the document page. Thus an aspect ratio of the paperless printer substantially matches an aspect ratio of the predetermined electronic document page size and a size of the border is substantially in proportion to a size of a corresponding margin.

In embodiments the lateral physical dimensions of the paperless printer are within 1 cm to that of an international paper size standard, in particular ISO 216 or ANSI/ASME Y14.1. In embodiments the foreground part of the document page displayed on the central rewritable portion extends to a distance less than 5 mm away from the non-rewritable border. Preferably no portion of the display extends in front of the display surface. Preferably the central re-writable portion of the display comprises an electrophoretic display element.

In embodiments the display has a front surface element and the border of front surface element is coloured with the background colour on a rear face of the front surface element. In embodiments the border of front surface element is coloured by embedding coloured particles into the rear surface. Then the electrophoretic display element extends beyond the re-writable portion of the display behind the coloured border, and the electrophoretic display element is substantially flush against the rear surface at an edge of the coloured border around the central re-writable portion of the display. The optical density of the coloured border may reduce gradually towards the central rewritable portion so that the boundary between the border and the central-rewritable portion is rendered less visible. The border may comprises electrophoretic display material. Preferably the background colour is substantially white, and the display surface has substantially the appearance of a piece of paper.

A paperless printer system including a paperless printer as described above may further comprise processor control code to input data defining the electronic document page, the processor control code cropping the margins of the electronic document page, and writing data for the cropped document page to the central re-writeable portion of the display such that an appearance of the margin of the document page is provided by the background coloured border of the paperless printer.

The paperless printer may include one or more touch sensitive elements for controlling the paperless printer, wherein at least one of the touch sensitive elements is disposed in one or more portions of the border region and the touch sensitive elements being arranged to generate a signal in response to a user touching the display surface in a region of the border to control the paperless printer. The touch sensitive elements may be disposed beneath the display surface and the border. Further touch sensitive elements may be disposed in a region of the central rewriteable portion of the device. Preferably at least one of the touch-sensitive elements disposed in the border region are operable by the touch of a finger. The touch sensor may be a capacitive touch sensor with at least one of its electrodes deposited onto a rear face of the front surface element.

In some preferred embodiments the paperless printer is bendable, conformable to adopt a non-planar shape and/or rollable.

We also describe a method of displaying a document page with a predetermined size using a paperless printer having edges defining lateral dimensions not substantially larger than the predetermined size and having a central re-writable display portion and a non-re-writable border, the document page comprising a central, foreground portion bearing one or both of text and graphics, a background having a background colour and at least one margin having the background colour, the method comprising: inputting page data defining a page for display; processing the page data to crop margins of the page such that, when displayed on the re-writable display portion, the non-re-writable border gives the appearance of the cropped margins, the processing generating cropped page data; and outputting the cropped page data for display on the re-writable display portion of the display.

The method enables a document to be displayed on a display comprising a non-re-writable portion, which emulates a border of the document being displayed. Preferably, therefore, the display has a front surface (or surface element) and the border of the front surface (or surface element) is coloured with the background colour on a rear face of the front surface (or surface element). Preferably, the border of front surface element is coloured by embedding coloured particles into the rear surface, and the electrophoretic display element extends beyond the re-writable portion of the display behind the coloured border, substantially flush against the rear surface at an edge of the coloured border around the central re-writable portion of the display. Preferably, the optical density of the coloured border reduces gradually towards the central rewritable portion whereby the boundary between the border and the central-rewritable portion is rendered less visible. Preferably, the background colour is substantially white so that the display surface has substantially the appearance of a piece of paper.

Thus embodiments of the method help to provide a paperless printer in which a displayed page appears to extend right to the edge of the device without the need for very sharp bends in flexible circuit board or wiring connecting to edges of the re-writable portion of the display. This is because by cropping the edges of a page prior to displaying the apparent margins of the page are provided by the non-re-writable borders of the paperless printer whilst the actual edge(s) of the rewritable display to which connections are made lie within the apparent edges of the displayed page.

Preferably, the lateral dimensions of the paperless printer are within 1 cm to that of a standard paper size, in particular ISO 216 or ANSI/ASME Y14.1. Preferably, the central foreground portion displayed on the central rewritable portion extends to a distance of less than 5 mm away from the non-rewritable border.

In some preferred embodiments such a method (and a method as described later below) is implemented in another (host) computer system from which the paperless printer receives processed, cropped page data. In embodiments the page cropping procedure is implemented using a printer driver of the (host) computer system.

Preferably, the central re-writable display portion comprises an electrophoretic display element. In embodiments of the method the paperless printer is not completely rigid, having at least a degree of flexibility to impart robustness to the device.

Preferably, processing said page data further comprises formatting a layout of one or both of said text and graphics of said document page such that said text and graphics are displayable on said re-writable display portion. The page data may be received from a device such as a laptop computer, desktop computer, Personal Digital Assistant (PDA), mobile telephone or smart telephone, either as page data for cropping by said display device or as pre-cropped page data, preferably in the form of page image data. The page data is preferably stored in a non-volatile memory store of the display device.

The predetermined page size may be a standard size such as an international standard ISO216 size (for example an A-series size such as A4 or A5, a B-series size such as B4 or B5 or a C-series size) or a substantially equivalent DIN, SIS of JIS size; or a North American standard size such as AWS1 Y14.1 (for example, letter, legal and the like). The document page may be displayed at substantially 1:1 scale (which may include a scale in one or both dimensions down to 0.9:1, 0.8:1 or 0.7:1).

This enables a device of, say, A4 size to display a page at substantially 1:1 scale on a device not substantially larger than the page size, in this example, A4 size. This is because the display can be smaller than (say) A4, the borders of the display giving substantially the same impression as the (background) of the display screen. This in turn, enables a viewer to have the impression that the displayed page extends right to the edges of the paperless printer. (It will be understood that in this specification references to a (background) colour include black, grey and white).

The processing to crop the margins of a displayed page may comprise a determining, for a set of pages of a document, a minimum margin size for, preferably each of top, bottom, left and right margins. This minimum margin size determines the amount which can safely be cropped from each of the respective margins without losing any information on a page. Preferably, therefore, in this context a margin is that portion of a page which, amongst the pages of a document for display, has information which does not substantially change from one page to the next. Typically this is a "white space" part of a page. Thus it will be appreciated that changing information such as a page number is not included in the margins since this information is preferably displayed on the re-writable portion of the display since it changes from one page to the next. Preferably the margin comprises a blank space on a page, that is a region of the page where there is substantially no information content (theoretically, in embodiments, information which does not change from one page to the next such as logo could be defined permanently in the non-rewriteable border).

The cropping may comprise removing edge portions of an image of a page and then, preferably, resealing the page to compensate for the cropping.

The page data is preferably in the form of image data defining an image of a page. This facilitates display almost any type of information since blank space margins can be identified by image processing. This in turn facilitates implementation of a technique in a printer driver, thus making the technique agnostic to the type of information displayed or the source of the information (word processor, image processor, music processor, e-mail, web pages, or any other source of printed information). The technique may therefore accept imaged data from a printer driver, for example incorporated within another electronic device, or the technique may be implemented within the printer driver itself, thus reducing the processing load on the electronic document reader and saving power. In still other embodiments, however, the page data may include explicit page layout information for processing.

In preferred implementations of the technique a pages is scaled so that when it is displayed at least one element of information which changes from one page to another substantially abuts an edge of the rewritable display portion adjacent the non-rewritable border. For a top margin this may comprise, for example, a page number. In other implementations or for example, at the option of a user, information of this type may be omitted from the display to provide a closer to a 1:1, paper-like representation of a displayed page. In this case, for a document, the margins may be defined by one or more boundaries or a boundary box of words or other information content on the page rather than by material which is in a header and/or footer or which is in what a word processor might define as a margin of the page.

We also describe a method of displaying one or more pages of a document on an electronic document reading device using a second, computerised electronic device, the method comprising: opening said document on said second electronic device using an application running on said second electronic device; using an intermediary code module coupled to said application to generate image data representing an image of a said page of said document to be displayed on said electronic document reading device; sending said image of said page to said electronic document reading device; and displaying said image of said page on said electronic document reading device.

In preferred embodiments of the method the electronic document reading device is able to display the one or more page images directly, without further rendering locally on the reading device (paperless printer). Preferably, therefore, the method involves one or both of scaling and cropping an image of page using image data from one or more other pages of the document prior to sending a page image to the electronic document reading device. In embodiments the image sent to the reading device has a resolution corresponding to a resolution of the re-writable display portion of the device and is displayed at substantially this resolution. Thus in some preferred embodiments the image data is provided to the document reading device in a standard image format, optionally compressed, so that it need not be re-scaled. One example of an image format which may be employed is the PNG (portable network graphics) image format, although many other image formats are possible; if compression is employed preferably this is lossless.

In some preferred embodiments the intermediary code module generating the image data comprises a printer driver for the application. Preferably the application is invoked by a management program, preferably in a manner which is hidden from the user. This may comprise running a document display management program on said second electronic device and using the management program to invoke the application to perform the opening of the document such that the opening of the document is hidden from the user. This enables automatic transfer of scaled and/or cropped documents or document pages from a host device to a document reading device of the type we describe, for example as part of an automatic, background synchronisation service. In embodiments this avoids a user needing to invoke a synchronisation function as the system will automatically render and send an image, at a suitable resolution, to the reading device for display.

Preferably the management program is used to select an application to use for opening the document, selecting a method of the invoking dependent on the application selected. In some preferred implementation the management program runs as a background service responsive to detection of a change in the document to automatically generate an image of at least a changed part of the document and to send the image of the changed part to the reading device. Additionally or alternatively however the application may be invoked via a user command to display part or all of a document, for example a user command to "print" a document to the paperless printer, a user dragging-and-dropping a document onto an icon representing the paperless printer.

In some preferred embodiments the management program performs the printing by controlling a relevant application for the document, transparently to the user, to process the document, using a printer driver to form pixel images of the one or more printed pages. In this way many complex functions supported by the application may be provided for the paperless printer without the need to implement these separately and for each different supported document type. The skilled person will understand from the forgoing that virtually any type of document may be supported in this way providing there is a suitable application on the second, computerised electronic device for printing the document conventionally. Thus "document" is to be interpreted broadly, including web pages, e-mails, image pages and many other types of document format even including for example, musical stores and the like.

We also describe a method of displaying one or more pages of a document on an electronic document reading device using a second, computerised electronic device, the method comprising: running a document display management program on said second electronic device; using said management program to invoke opening of said document on said second electronic device using an application running on said second electronic device; using a printer driver for said application to generate data representing said page of said document to be displayed on said electronic document reading device; and sending said data representing said page to said electronic document reading device for display.

We also describe a consumer electronics device including a processor and non-volatile memory and programmed to display one or more pages of a document on an electronic document reading device using a second, computerised electronic device by: opening said document on said second electronic device using an application running on said second electronic device; using an intermediary code module coupled to said application to generate image data representing an image of a said page of said document to be displayed on said electronic document reading device; and sending said image of said page to said electronic document reading device for display on said electronic document reading device.

We also describe a consumer electronics device including a processor and non-volatile memory and programmed to display one or more pages of a document on an electronic document reading device using a second, computerised electronic device by: running a document display management program on said second electronic device; using said management program to invoke opening of said document on said second electronic device using an application running on said second electronic device; using a printer driver for said application to generate data representing said page of said document to be displayed on said electronic document reading device; and sending said data representing said page to said electronic document reading device for display.

The above-described methods and devices may be implemented using processor control code, for example on a general purpose computer system or on a digital signal processor (DSP). The code may be provided on a carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Features of the above described aspects and embodiments of the invention may be combined in any combination.

BRIEF DESCRIPTION OF THE DRAWINGS

These and other aspects of the invention will now be further described by way of example only, with reference to the accompanying figures in which:

FIGS. 1a to 1c show, respectively, a front, display face view, a rear view, and a vertical cross-section view of an electronic document reading device according to an embodiment of the invention;

FIG. 2 shows a detailed vertical cross-section through a display portion of the device of FIG. 1;

FIG. 4b shows a cross section through the edge of the device for FIG. 4a;

DETAILED DESCRIPTION OF PREFERRED EMBODIMENTS

Figure 3A:
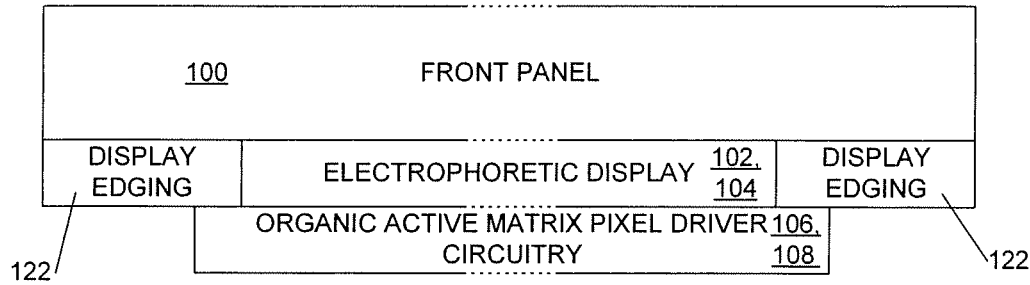
FIGS. 3a and 3b illustrate display edging for the device of FIG. 1.

Referring to FIGS. 1a to 1c, these schematically illustrate an electronic document reading device 10 having a front display face 12 and a rear face 14. As can be seen from FIG. 1c, in preferred embodiments the display surface 12 is substantially flat to the edges of the device and, in particular, lacks a display bezel. However in embodiments described later it will be seen that the electronic (electrophoretic) display does not extend right to the edges of the display surface 12, and rigid control electronics are incorporated around the edges of the electronic display, this approach reducing the overall thickness of the device and thus facilitating flex-tolerance, at the expense of making the overall area of the device slightly larger.

Referring now to FIG. 2, this illustrates a vertical cross-section through a display region of the device between the frame members 16. The drawing is not to scale.

As can be seen, in preferred embodiments the device has a substantially transparent front panel 100, for example made of Perspex (RTM), which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is an electrophoretic display 104, although alternative display media such as an organic LED display medium or liquid-crystal display medium may also be used. A moisture barrier 102 is provided over the electronic display 104, for example of polyethylene and/or Aclar™, a fluoropolymer (polychlorotrifluoroethylene-PCTFE). A moisture barrier 110 is also preferably provided under substrate 108; since this moisture barrier does not need to be transparent preferably moisture barrier 110 incorporates a metallic moisture barrier such as a layer of aluminium foil. This allows the moisture barrier to be thinner, hence enhancing overall flexibility.

Approximate example thicknesses for the layers are as follows: 100 μm for moisture barrier 110, 200 μm for substrate 108, 5-6 μm for active layer 106, 190 μm for display 104, and 200 μm for moisture barrier 102. The set of layers 102-110 form an encapsulated electronic display 112; preferably this is bonded, for example by adhesive, to a transparent display panel 100. The front panel 100 may have a thickness in the range 0.5-2 mm, for example approximately 1 mm.

Surprisingly it has been found that the presence of the front panel 100 has little effect on the overall visual appearance of the display, in particular the contrast ratio. It is speculated that this is because although whites become slightly greyer, black becomes slightly blacker.

As mentioned above, the active area of the display does not extend to the edge of the display surface, which enables the electronics to control the active display to be placed around the edge of the reading device.

Referring to FIG. 3a, this schematically illustrates a display edging arrangement (the illustration is simplified, and not to scale). As shown the display edging 122 is provided around the perimeter of the electrophoretic display 104. This display edging is coloured to substantially match the colour of the active display area 104, which gives the appearance that the reader is a single display extending to the edges of the reader device. Thus in embodiments a boundary between the active display area and a border of the active display area forming margins of a displayed page is at least partially concealed and may be substantially invisible.

In an embodiment, the display edging may comprise a simple border which may be, for example, sprayed onto the front panel 100. However in other embodiments to provide a uniform appearance to a user display edging 112 may comprise electrophoretic display material such as an additional, undriven sheet of electrophoretic display or an undriven lateral extension of electrophoretic display 104.

Figure 3B:
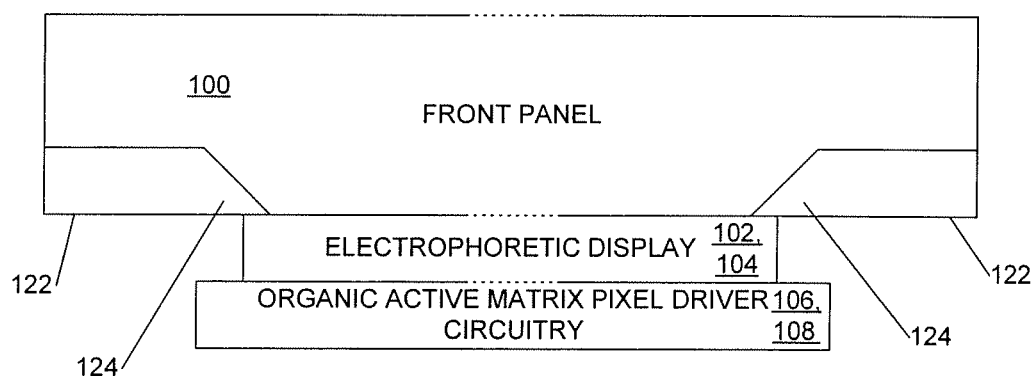

FIG. 3b shows an alternative embodiment of the display, which comprises a display edging 122 that forms part of the front panel 100. Techniques such as dye sublimation are used to embed the transparent front panel with coloured particles. Other techniques for embedding coloured particles into the material of the transparent front panel 100 may be used.

A tapered portion 124 of the embedded particles, where the depth of penetration of the particles into the front panel decreases as the distance from the edge (towards the centre of the device) increases, provides a gradual fade from the display edge to the active display. Such a taper provides a softer edge between the display edge and the active display, which further helps to create the illusion that the active display extends to the edge of the reading device.

Further, the device comprises a visual continuation between the border of the device and the display, such that the display is flush to the border of the device. The visual continuation of the two components (the border and the display) is such that the appearance of a material continuation between the two components is also provided.

In embodiments, the electronic document reader comprises connectors located along an edge of the device to enable the device to be connected to other electronic devices, such as a laptop or desktop computer, a PDA (Personal Digital Assistant), a mobile phone or 'smart' phone, or other such devices. A USB (universal serial bus) or similar connector is, for example, provided. However, in embodiments, the electronic document reader may also be provided with wireless interfaces (for example a infrared or Bluetooth™ or other such interfaces). Such connections enable documents to be transferred to and from the electronic document reader.

The device may also include a number of user controls for selecting documents and/or pages, turning pages forward and back and the like. In embodiments, the border around the active display comprises touch sensitive elements. However in other embodiments the display may be touch sensitive, for example as described in our co-pending international patent application PCT/GB2006/050220 hereby incorporated by reference in its entirety. Such sensors may include capacitive sensors or resistive touch sensors. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed. In such embodiments, documents may be electronically "marked-up", with mark-up data being written to or being associated with the electronic document being displayed.

Figure 4A:
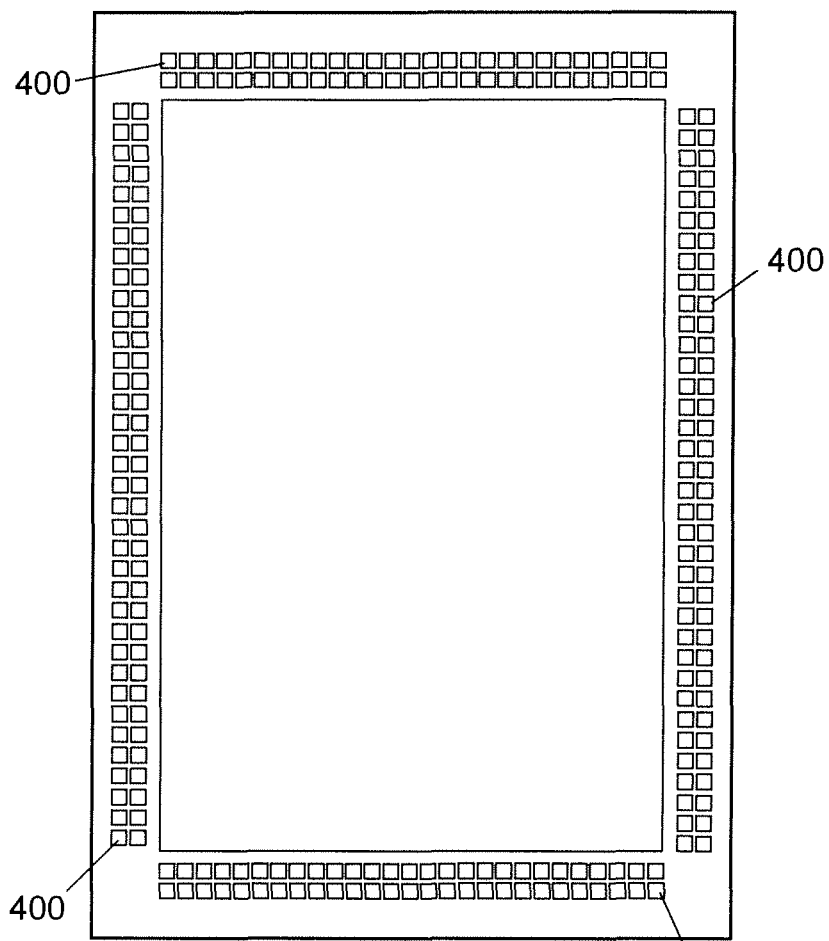
FIG. 4a shows a device having a border comprising touch sensitive elements.

As mentioned above, embodiments may have a border comprising touch sensitive elements, as shown for example in FIG. 4a. Such elements may provide a number of user controls for selecting documents and/or pages, turning pages forward and back and the like. The touch sensitive elements may be arranged around one or more of the borders of the device. The touch sensors may be arranged such that location agnostic gestures are enabled, wherein a user may perform the same gesture at any point around the border to produce the same result, in particular, independent of orientation (portrait or landscape) of the device.

Figure 4B:
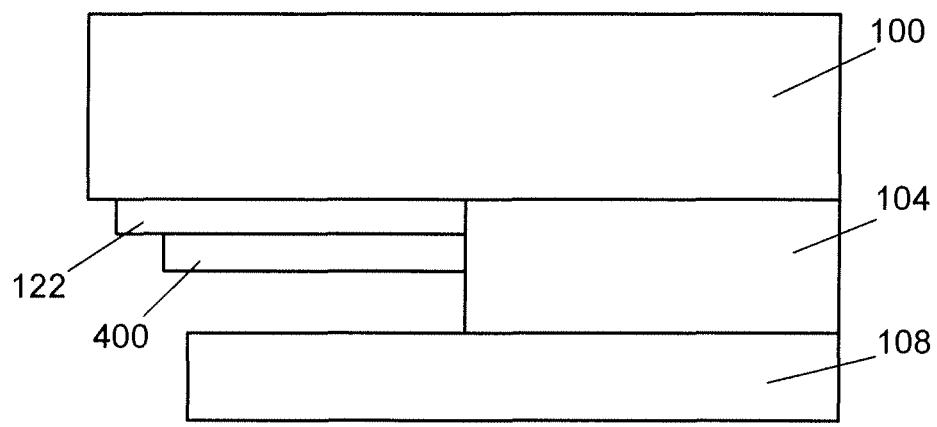

FIG. 4b shows a cross section through the edge of a device. To form such touch sensors, an upper conductive layer of the touch sensor is patterned on the underside of the border 122. The upper conductive layer is patterned to produce a sensor array, which is formed of a design so as to enable touch sensitive gestures to be provided, both in a horizontal and vertical direction. The upper conductive layer may be a conductive polymer or preferably a metallic layer, such as, but not limited to copper, nickel, gold or silver or alternatively a printable metal. The conductive layer maybe deposited using techniques such as vacuum deposition, electroplating and printing techniques, such as screen printing.

An insulator material layer is then deposited over the upper conductive layer, by techniques such as but not limited to, spray or blade coating or printing techniques. A lower conductive layer is then deposited over the dielectric layer and patterned, as above. The lower conductive layer forms the ground plane and may also form the tracking plane. Alternatively, a separate conductive layer may be deposited and patterned as above to form the tracking plane, separated from the adjacent conductive layer by a further layer of dielectric material.

Via hole interconnects are formed between the sensor array and the tracking plane, in order to connect these two layers electrically. The tracking plane is then in turn connected to the electronics of the device.

There are several ways that the connection may be formed between the upper conductive layer and the electronics of the device. Such connections may be formed mechanically, with the aid of an adhesive or through a welding process.

As mentioned above, in preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Figure 5:
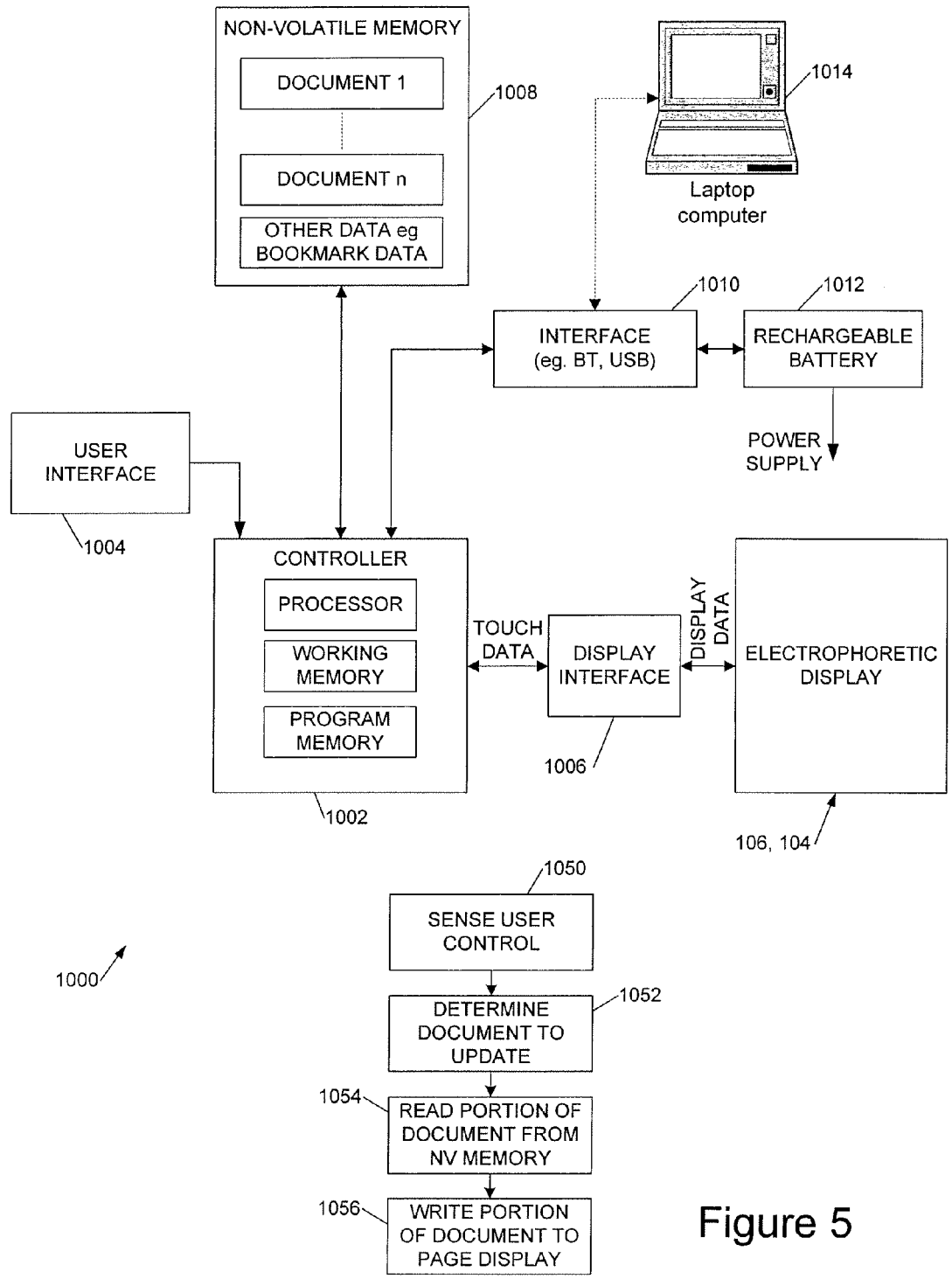
FIG. 5 shows a block diagram of control electronics for an electronic document reader according to an embodiment of the invention.

Referring now to FIG. 5, this shows example control circuitry 1000 suitable for the above-described electronic document reader 10. The control circuitry comprises a controller 1002 including a processor, working memory and programme memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The control electronics also includes non-volatile memory 1008, for example Flash memory for storing data for one or more documents for display and, optionally, other data such as user bookmark locations and the like. An external interface 1010 is provided for interfacing with a computer such as laptop, PDA, or mobile or 'smart' phone 1014 to receive document data and, optionally, to provide data such as user bookmark data. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics as well as greater resistance to moisture. A rechargeable battery 1012 or other rechargeable power source is connected to interface 1010 for recharging, and provides a power supply to the control electronics and display. The skilled person will appreciate that processor control code for a wide range of functions may be stored in the programme memory. By way of example a simple document display procedure may comprise, in operation, sensing a user control 1050, determining which document to update 1052, reading a portion of the relevant document from the non-volatile memory 1054, and writing the read portion of the document to the page display 1056.

As discussed above, electronic documents to be displayed on the reader may come from a variety of sources, for example a laptop or desktop computer, a PDA (Personal Digital Assistant), a mobile phone (eg Smart Phones such as the Blackberry™), or other such devices. Using the wired (eg USB etc) or wireless (eg Bluetooth™) interfaces, the user can transfer such electronic documents to the document reader in a variety of ways. Electronic documents may comprise any number of formats including, but not limited to, PDF, Microsoft Word™, Bitmaps, JPG, TIFF and other known formats.

There are three main ways in which the transfer of files may occur.

A first is the act of transferring the file from a device, such as a mobile phone or a smart phone to the reader. Once transferred, the file is then displayed on the reader. A second method of transfer is the synchronisation of documents between the reader and a device, as long as the reader is connected to a device such as a laptop. The same document is therefore available on both devices. A third method of transfer is the act of printing the document from a device such as a laptop or PC onto the reader. The image of the document is therefore transferred to the reader. These methods will now be described in more detail.

In a first method, electronic documents are stored in a separate laptop or desktop computer, PDA or 'smart' phone. The user then connects the electronic document reader to any of the above devices using the wired or wireless interfaces to synchronise the reader to the devices. During this synchronisation, electronic documents that are stored in any number of user-defined folders defined on the computer, PDA device or 'smart' phone, and that are not present in the memory of the reader are transferred to the reader. Similarly, any documents not present on the computer, PDA or 'smart' phone that are present on the reader (for example, documents that have been modified or written to whilst displayed on the reader) may also be transferred back to the computer, PDA or 'smart' phone.

In such a method, the Personal Computer (PC) takes control of the device and transfers data to and from the device. To understand the capabilities of the device, the PC may require several software components to be installed, for example, a printer driver; a device driver (to manage the details of the communications protocol with the device) and a controlling management application.

A second method of transferring the documents is similar to the first, in that documents between a computer, PDA or 'smart' phone are synchronised with the documents present in the memory of the reader. However, before the transfer begins (using the wired or wireless interfaces), the user may select which documents are synchronised. This may be achieved, for example, using a document management programme running on the computer, PDA or 'smart' phone. The user indicates a selection on the computer, PDA or 'smart' phone and only those files are synchronised. Alternatively, a live synchronisation may be performed, where the reader could store all documents that have been recently viewed on the computer, PDA or 'smart' phone.

A third method of transferring electronic documents to the reader from a computer, PDA-type device or 'smart' phone involves the use of an intermediary module to convert the electronic document into a suitable format for displaying on the display. In such a method, the user "prints" the document to the reader so that the "printed" document is displayed on the active display of the reader. The intermediary module may include, amongst others, a printer driver module.

Thus an aspect the invention also provides a method uses an intermediary module to generate an image file of each page within a document being printed (although it is not essential, in embodiments of the invention, to employ such a technique).

These images may be compressed and stored in a native device format used by the electronic reader. These files are then transferred to the electronic reader device as part of a file synchronisation process.

One of the advantages of this technique is that it allows support for any document/file for which the operating system has a suitable intermediary application, such as a printer driver, installed. During the file synchronisation sequence the control program looks at each document and determine whether the operating system associates an application with that file, for example, a spreadsheet application will be associated with a spreadsheet document. The control application invokes the associated application and asks it to 'print' the document to the device printer. The result will be a series of images in the device format corresponding to pages of the original document and will appear on the electronic reader, as if the document had been printed.

The intermediary module may reside in the computer, PDA or 'smart' phone printing the document, or reside in the document reader. Once a document has been selected for printing to the reader, the intermediate module processes the electronic document to enable the document to be displayed on the reader or on a remote server connected to the PC, PDA or 'smart' phone. Processing may include adjusting or cropping margins, reformatting or repaginating text, converting picture elements within a document into a suitable displayable content, and other such processes. In embodiments, the intermediate module may, for example, be a device programme such as a printer driver.

A fourth method of transferring electronic documents to a reader involves the use of Smart or mobile telephones that are capable of receiving and reading documents (whether attached to or embedded in a message), for example the Blackberry™. In such a method, the act of "opening" a document within the telephone processes and transfers the electronic document to the reader for displaying. Again, this method of opening a document may utilise an intermediary module to process the document, as described above.

In such a method, the device may receive the documents via a wireless link such as Bluetooth™. A Bluetooth equipped 'smart' phone transfers files stored in its internal memory to the device. On receipt of such a file, if the file consists of a file format supported natively by the device, the device renders the pages from the document to store in the device memory. As soon as the first page is available, the file will be displayed on screen of the device. Alternatively, the pages of the file may be rendered before transmission to the device. Further, a remote server may be accessed by a intermediary device, such as a PDA or a mobile or smart phone. The information received by the intermediary device may be stored on such a device, before sending the document on to the reader device.

Alternatively, the reader may be used as a storage device, for example, in the form of a USB memory stick. Documents of interest may be transferred to the reader for the user to access at a later date.

The active display area and (inactive) display edging are arranged to provide the user with the appearance of a screen with a border or margin. Furthermore, in embodiments, the document reader is dimensioned such that a page of an A4 document (ISO 216), or a document in a US letter (ANSI/ASME Y14.1) format, or any standard paper size, may be displayed at a 1:1 scale. Such an arrangement provides the user with a document reader that therefore mimics the appearance of a printed sheet of A4 or US letter (or other like document formats).

However, electronic documents for displaying on the document reader generally comprise an unused border or margin around the edge of the text. If such a document were to be presented on the display of the reader, there would be an unwanted and unnecessary border or margin around the document being displayed. There is therefore a need to remove this unwanted margin from the electronic document. Such a removal of unwanted border or margin from the electronic document would advantageously maximise the use of the active display area. The display edging therefore becomes the border or margin that be present.

In addition to the reader, there is therefore also provided a cropping module that is configured to process the electronic document to remove the unwanted border around the text present in the document. The cropping module may reside in the reader or the device from which the document is being transferred.

A device may be made such that the overall layout resembles standard paper sizes, such as A4 or US letter. However, the active display part of such a device cannot extend to the border of the device due to the electronics required to drive that display. When showing a document on such a display there are several possibilities:

Show the document at actual size. In this case, the edge of the document will be lost to view as it will correspond to the area of the device that hides the electronics. However, this is unlikely to be satisfactory as the lost area may include text or images that form part of the document.

Scale the document to the active display area. In this case, the whole document is shown, but will be reduced in size significantly.

Process the document to analyse how much margin area there is on a document and scale the document such that only this margin area is lost behind the electronics. In this case, no information is lost and the maximum size of content is retained.

In order to generate the images for this latter choice, it is preferable to process the whole document. It is important when viewing the document on the device that any scaling factor applied to a page of the document is retained throughout the whole document. This inhibits the text from growing or shrinking as the user changes page.

In the general case, the process knows nothing about the structure or content of a document. In order to generate the information, it is necessary to process the document in two passes. The first pass will "print" the document to a series of images; each image representing a single page. On each page, the largest margin on each of the four sides is determined. For each side, the smallest of the set of pages is retained. So for example, if on page 1, the top margin is 10 mm and on page 2 the top margin is 20 nm, we retain 10 mm as the smallest of the largest margin available.

At the end of the first pass, sizes are available for each of the margins. A simple calculation will work out a (proportionally correct) scale factor that will allow content on any page in the document to be shown in the active display area of the device. The scale should be adjusted to ensure that it never makes the text larger than life-size (1:1 scale). This value is used to run the document through a second pass of printing, to optimise the print for the display.

Figure 6A:
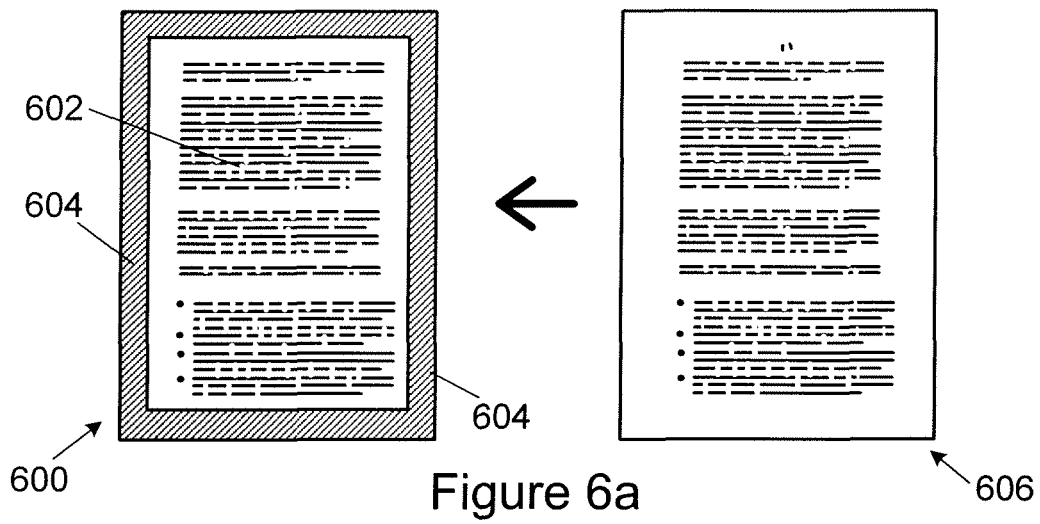
FIGS. 6a to 6c show examples of fitting document pages to a re-writable display portion of an electronic document reader.

Referring now to FIG. 6 this shows an electronic document reading device (paperless printer) 600 with a re-writeable electrophoretic display portion 602 and a border region 604 (in FIG. 6 the border is shaded for clarity; in reality it is matched to the re-writeable display area so as to appear like a continuation of the display area). A typical printed document has one or more pages 606, each page of which will have a margin on each of the top, bottom, left and right side which contains no content.

Figure 6B:
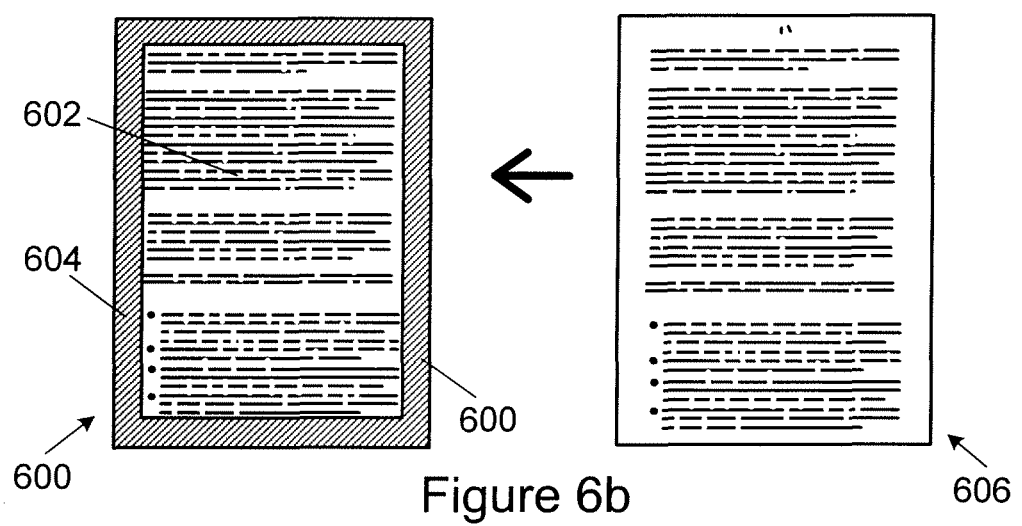
Figure 6C:
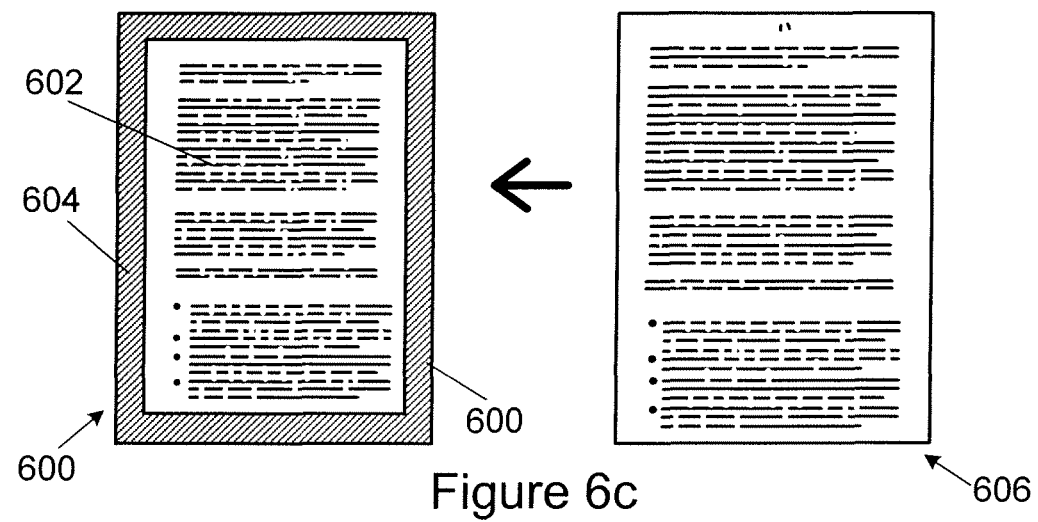

In an ideal situation (FIG. 6a), the size of the margins would be at least the same size as the display edging of the reader. If such a page is displayed on the reader at the same size as it would be printed on a conventional printer (a preferred default setting of the device), then the reader will not lose any content (the margins correspond to the non re-writeable display area). However, in general not all the pages will meet this requirement: Their margins are likely to be smaller than the device edging, and in this case part of the content will be obscured as shown in FIG. 6b. Therefore, it is desirable to reduce the physical page size, to display all of the content, as shown in FIG. 6c.

In a general case the process for analysing a document knows nothing about the structure of the document and determines, the margin information it uses from images of the pages. In an embodiment these images are created using a program which is configured to appear to an application like a (printer driver) program for regular printer page generation. However, at the end instead of sending a printer command set to a printer, it creates a bitmap image on disc.

Figure 7:
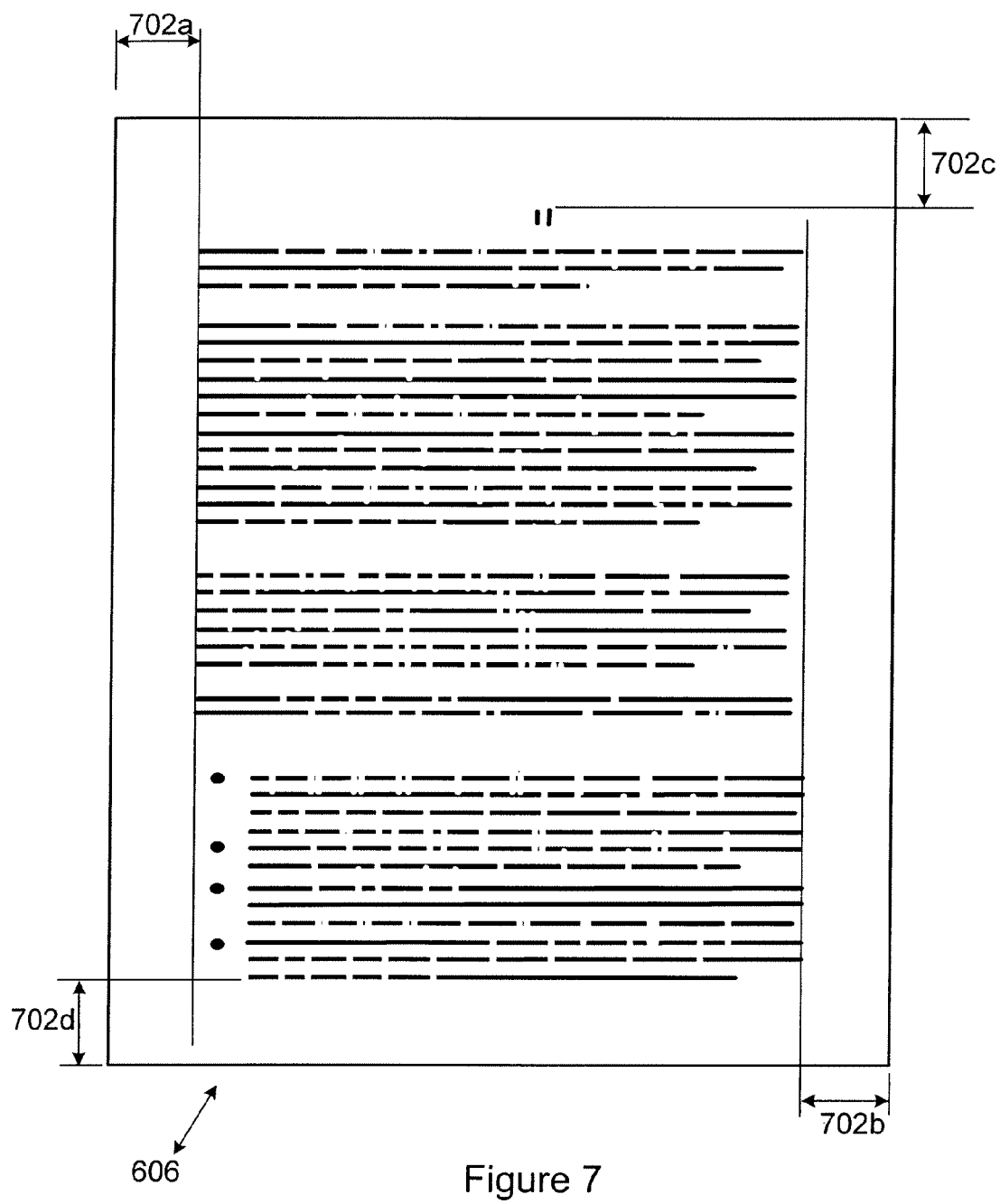
FIG. 7 shows margins of an example document page.

A management application program then loads this image and examines the image and determine what the margins 702a-d are, as shown in FIG. 7. The skilled person will appreciate that the determination these margins for a page is relatively straightforward. The page image can be then recreated to a size that allows the actual content to be optimally fitted to the resolution of the active display area.

If first image generation pass could be created with the "correct" scaling factor, this would remove the need to run the computationally expensive process again for the second pass. It is possible to make a reasonable guess based upon previous knowledge of document types. This can take advantage of the fact that many users set their margins once in their word processor and use those settings for all documents. Embodiments of the process may then "learn" that setting, optimally separately for each user of a device.

However it is possible, often likely, that many pages within a document have different margins. This would provide a poor reading experience if each page were scaled individually. For example, as the reader changed pages the same 12 pt font could be rendered at any size from 100% of the print equivalent down to 70% of the original. It is thus desirable to apply the same scaling to the whole document. To achieve this, rather than look at the margins of a single page preferably substantially every page is examined. For each of the left, right, top and bottom margins the process finds the smallest measured value found throughout the whole document. These values can then be used to re-parse the whole document to an optimal scaling to suit the display, that is a scaling in which the largest actual content size just fits on the re-writable portion of the display.

Figure 8:
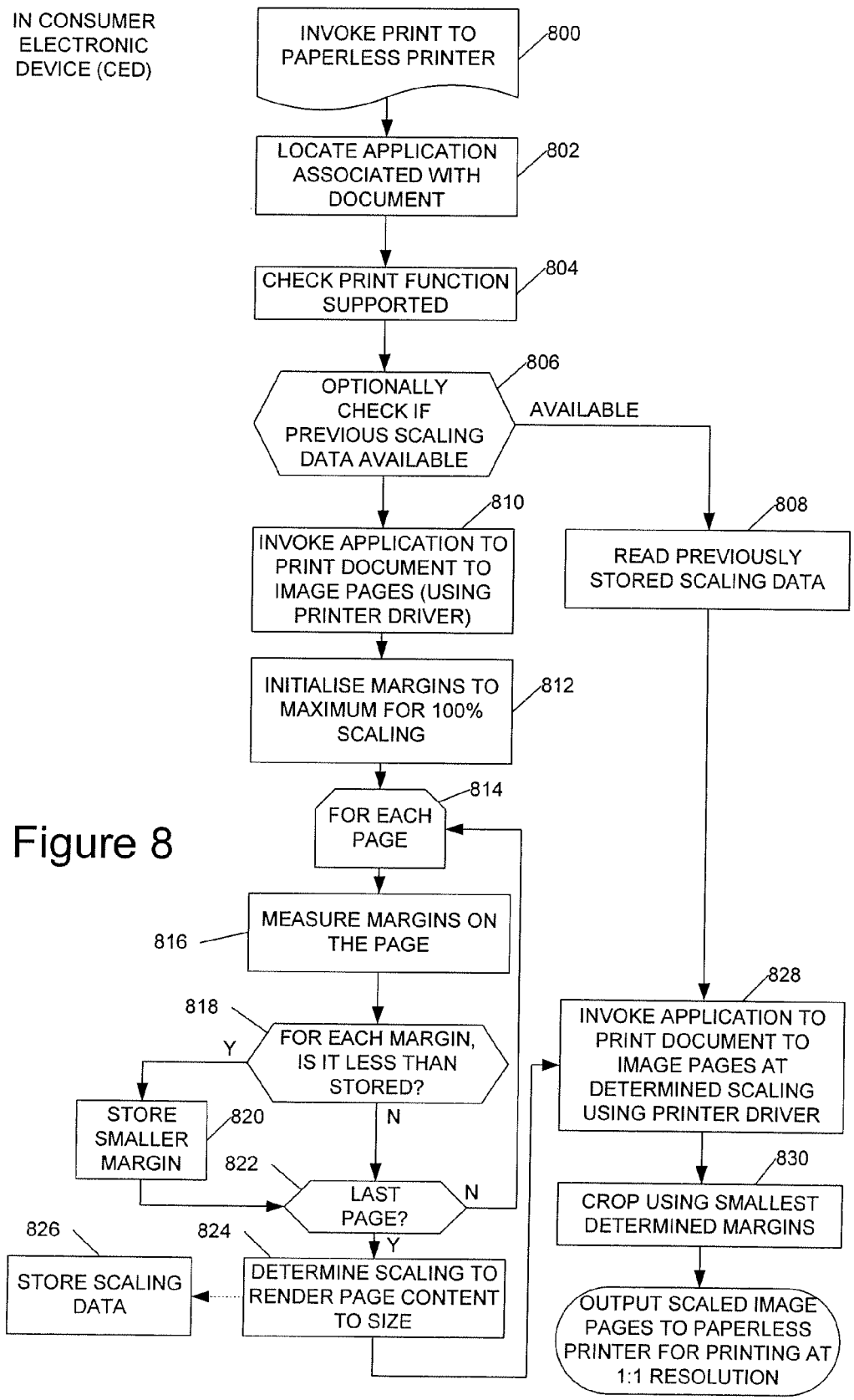
FIG. 8 shows a flow diagram of a procedure for establishing and applying a common scaling to pages of a document with multiple pages to fit the pages within a re-writeable display portion of an electronic document reader.

Referring now to FIG. 8, this shows a flow diagram of a procedure to enable use of the processing power of a "host" consumer electronics device to render, re-scale and crop page data, providing images of pages for direct display on an electronic document reading device (paperless printer), thus substantially reducing the processing burden on the display device. This in turn facilitates achieving extremely long battery life times in the "printer".

In the procedure of FIG. 8, a document 800, either stored locally or received from a remote source, is used to invoke a "print" function on the paperless printer (this is described further below). The procedure then locates an application associated with the document (802) and checks (804) that a print function is supported for this type of document (if it is not an error message can be displayed). The procedure then optionally checks if previous scaling data is available, for example determined from another document previously printed by the same user. If this information is available the procedure reads the information from non-volatile memory (808); otherwise the procedure continues, and determines a scaling to employ.

Thus at step 810 the procedure invokes the relevant application for the document to print the document using a printer driver to a set of image pages, preferably at a resolution of the paperless printer (electronic document reading device), for example in one embodiment 1280×1220. The procedure then initialises a set of margin sizes for left, right, top and bottom margins to a set of maximum values (for 100% scaling), at step 812. Then, for each page (814) the procedure measures the margins on the page (816) as shown in FIG. 7 and, for each margin (818) determines whether or not the margin is less than the relevant stored value, updating the stored value (820) if the measured margin is smaller, and continuing (822) until the last page is reached. The procedure then uses the smallest margin values to determine a scaling which is to be applied to all of the pages so that one or more pages with a smallest margin size fit within the re-writeable portion of the display (824). Optionally this scaling data is stored, optionally together with a user identification (826) for later use in printing a second document without repeating the scaling procedure.

The procedure then invokes the application for the document a second time to "print" to image pages at the determined scaling using the printer driver, providing the desired scale as an input to the print-to-image driver. The management program then crops the images using the smallest determined margins (830), the result of this again being images of pages at substantially the same resolution as that of the electronic document display device (paperless printer), for example 1280×920. These images are then sent to the electronic document reader for a "printing" (display) at 1:1 resolution, thus substantially reducing the processing burden within the electronic document reading device. The scaled "printing" at step 828 can straightforwardly implement advanced functions such as anti-aliasing and font hinting (for grey scale fonts) since these functions are performed by a printer driver for the application. Thus, broadly speaking, a result of the procedure is to strip off margins, the same size for each page, in which no information content is present and then to stretch the resulting page, automatically scaling fonts and performing functions such as hinting, to match a target resolution for the paperless printer.

The skilled person will appreciate that there are many ways in which to transfer the image data to the paperless printer, for example providing the information directly to the device or as part of a synchronisation routine to synchronise content in one or both directions between the consumer electronic device and the paperless printer. The paperless printer, in embodiments, stores actual images of pages rather than data defined in the content of a page at some higher level. In this context an image of a page comprises a map with a pixel value defining the pixel colour, grey scale, or black/white level, for substantially each pixel of the re-writeable display portion of the paperless printer. This image data may be compressed, for example according to a lossless technique. Surprisingly an image of a page typically occupies only 10-20 KB and is thus not significantly less efficient then page data represented in a higher level format such as ASCII once additional formatting data is taken into account. Thus non-volatile memory in the paperless printer may store tens of thousands of pages.

Figure 9:
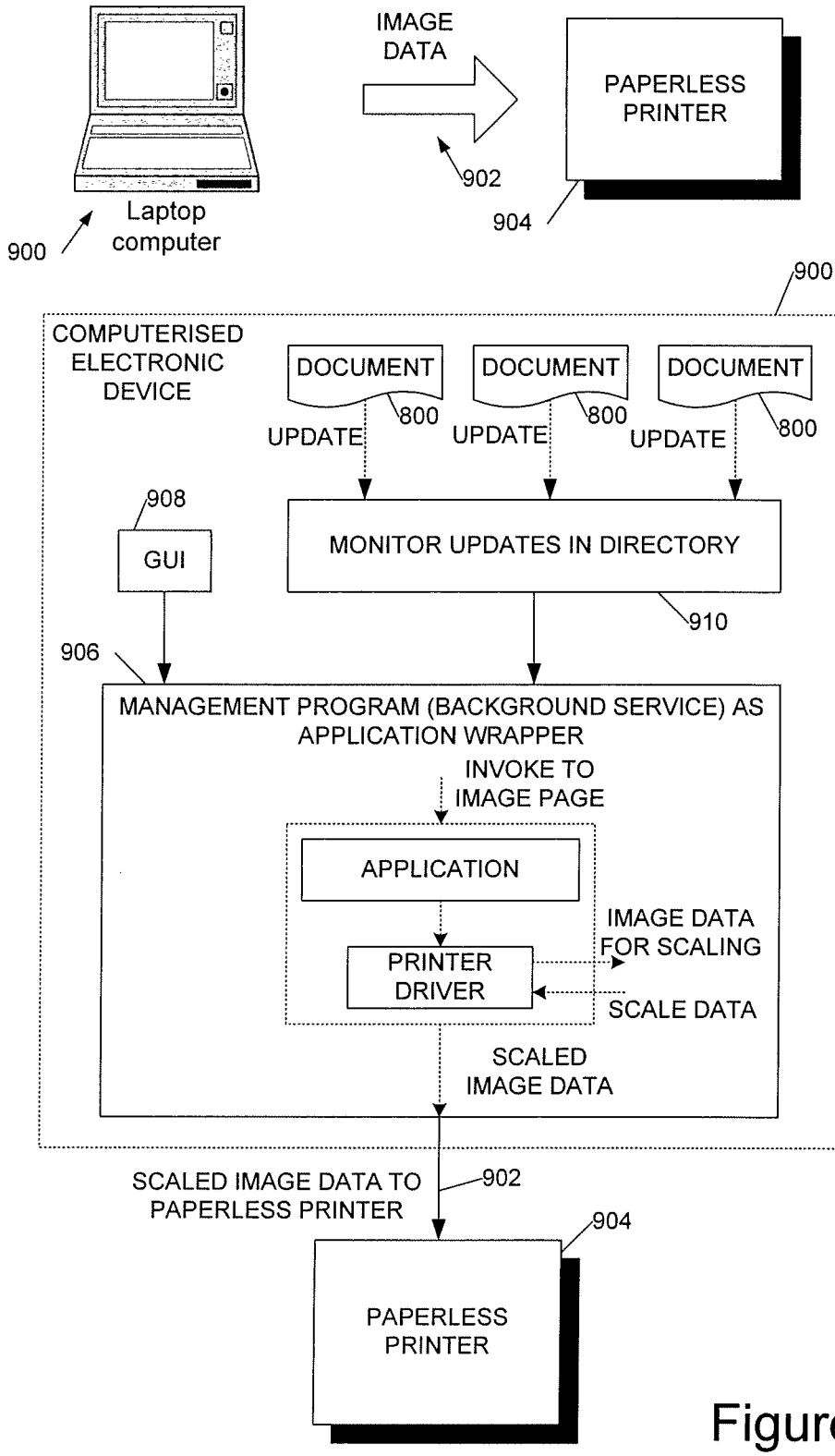
FIG. 9 shows a block diagram of a system for implementing a paperless electronic document printing procedure.

Referring next to FIG. 9, this shows more details of how elements of the procedure of FIG. 8 are distributed between different software modules and implemented. Thus the procedure of FIG. 8 in the example of FIG. 9 is implemented on a laptop computer 900, although it will be understood that other types of computerised electronic device may also be employed including, but not limited to, a PDA (personal digital assistant) and a mobile phone. Page image data 902 at a resolution substantially equal to that of a resolution of the paperless printer is sent to the paperless printer 904 for display. Optionally (not shown in FIG. 9) information such as annotation data representing user annotations on a paperless printer document may be transferred back from paperless printer 904 to consumer electronic device at 900, for example as part of a synchronisation procedure.

In preferred embodiments, the management program 906 runs as a background service on the device 900, hidden from a general user. A graphical user interface 908 is provided, for example on a desktop of device 900, to allow a user to setup parameters of the paperless printing mechanism, although in preferred embodiments the "printing" itself happens automatically. That is, in some preferred embodiments a system 910, for example provided by an operating system of device 900, monitors one or more directories for changes in documents 800 and on detection of a change informs the management program 906. This then automatically invokes a synchronisation procedure to provide an update document image, using the technique described above. In this way the management program automatically "prints" documents (or at least a changed part of a document), in a visual, image format, to the electronic reader when a document changes. The image information is stored on the electronic reader although it need not be displayed immediately. This sync update can be quick, in part because the processing is performed on the host. Optionally a drag-and-drop interface may also be provided for a user so that when a user drags and drops a document onto an appropriate icon the management program provides a (transparent) paperless print function for the user.

Thus in one embodiment in a Windows (registered Trademark) environment the management program opens a hidden desktop (a Windows function) and then opens the relevant application for the document in the hidden desktop. The application is run to process the document and print the document using a printer driver to print to an image file. This image file is then parsed by the management program 906 which determines a scaling, and then the document is reprinted at the determined scaling (if a scaling is known the initial parsing procedure may be omitted). The management program then crops the scaled image data and outputs image data at a pixel resolution suitable for the paperless printer 904, for printing without further rendering. Thus when the documents is wanted for display on the paperless printer, minimal further processing is necessary.

This technique may be used for a range of programs including, for example, Microsoft Word, Microsoft Outlook, Internet Explorer (all Registered Trademarks) and the like. For other programs, for example XL2007 (Registered Trademark) rather than opening a hidden desktop the application may be invoked by the management program 906 by running a script. Similar approaches may be adopted in other operating systems, for example Apple Mac computers based on a Unix-type operating system.

The skilled person will understand that, in this specification, "document" is used broadly since the techniques we describe are applicable to any information on a page, not just words, including for example, pictures, music and in general any material which may be printed to a page. Thus references to pages of a document are to be interpreted broadly and may include, for example, web pages, e-mails, image pages and many other types of document, for example music scores. It will also be understood that embodiments of the device we describe may be used for writing as well as reading, for example to annotate a page which is being read.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. A paperless electronic printer system for displaying a printed document on an electronic paper display, the system comprising:
    a device that is arranged to
    run a document display management program;
    locate, by said document display management program, an application associated with said printed document;
    automatically invoke, by said document display management program, opening of said document on said device using said application associated with said printed document such that opening of said document is hidden from said user;
    generate, by said document display management program, print data in response to said automatic opening of said document, said print data print data comprising data for one or more document pages to be printed, said print data comprising an image of a said document page to be printed being scaled by said device based upon scaling data determined from a document previously printed by a user associated with the one or more document pages to be printed wherein the same scaling data is applied to the whole document; and
    a portable paperless electronic printer comprising:
    an input to receive said generated print data;
    non-volatile memory for storing said generated print data;
    a non-volatile reflective display to provide an electronic paper display of a document page of said stored generated print data;
    and
    a processor coupled to said inputs, to said non-volatile memory, and to said non-volatile reflective display and configured to input said generated print data, to store said generated print data in said non-volatile memory, to provide to said non-volatile reflective display data for displaying a said document page derived from said stored generated print data;

wherein said automatic opening of said document is triggered by an automatic background synchronisation service to provide image data from said device to said portable paperless electronic printer.

2. A system as claimed in claim 1 wherein said data derived from said print data comprises a lossless compressed version of said print data.

3. A system as claimed in claim 1, wherein said data derived from said print data defines an image of a printed said document page with cropped margins.

4. A system as claimed in claim 1 wherein said non-volatile reflective display has a border substantially visually matched to said display to give the impression that part of a displayed document page extends beyond said display into said border.

5. A system as claimed in claim 4 wherein said data derived from said print data defines an image of a printed said document page with cropped margins and wherein said part of a displayed document page which extends beyond said border comprises said cropped margins of said document page.

6. A system as claimed in claim 4 wherein said display and said borders have a lateral spatial extent substantially equal to a size of said displayed document page, whereby said displayed document page extends substantially to lateral boundaries of said paperless electronic printer.

7. A system as claimed in claim 4, wherein no portion of said display extends in front of said display surface.

8. A system as claimed in claim 4, wherein said border includes touch sensitive regions.

9. A system as claimed in claim 8 wherein said paperless electronic printer has a portrait orientation and a landscape orientation, and wherein said processor is configured to recognise one or more touch gestures performed on said border irrespective of said orientation.

10. A system as claimed in claim 1 wherein said non-volatile reflective display comprises an electrophoretic display.

11. A method of printing a document onto an electronic paper display, the method comprising:
running a document display management program on a second device;
locating, by said document display management program, an application associated with said document;
automatically invoking, by said document display management program, opening of said document on said second device using said application associated with said document such that opening of said document is hidden from said user;
generating print data at said second device using said document display management program, said print data comprising data for one or more document pages to be printed
scaling at said second device said print data based upon scaling data determined from a document previously printed by a user associated with the one or more document pages to be printed wherein the same scaling data is applied to the whole document;
sending said scaled print data to said electronic paper display;
storing, at said electronic paper display, data derived from said print data in non-volatile memory;
reading, at said electronic paper display, said data derived from said print data from said non-volatile memory;
providing to a non-volatile display of said electronic paper display document page data for displaying a document page derived from said stored data; and
displaying said document page data on said non-volatile reflective display to mimic said document page when printed on paper;
wherein said automatic opening of said document is triggered by an automatic background synchronisation service to send said scaled printed data from said device to said electronic paper display.

12. A method as claimed in claim 11 wherein said non-volatile reflective display is smaller than said displayed document page and has a non-rewriteable border, and wherein said displaying comprises displaying said document page such that said border gives the impression of a margin of said document page.

13. A method as claimed in claim 11 wherein said print data comprises an image of a printed said document page at substantially a resolution of a re-writeable portion of said electronic paper display, said re-writable portion of said electronic paper display comprising said non-volatile reflective display.

14. A portable paperless electronic printer as claimed in claim 11 wherein said non-volatile reflective display comprises an electrophoretic display.

15. A non-transitory computer readable medium carrying processor control code to, when running, implement the method of claim 11.

* * * * *

UNITED STATES PATENT AND TRADEMARK OFFICE
CERTIFICATE OF CORRECTION

PATENT NO. : 8,836,970 B2
APPLICATION NO. : 12/138967
DATED : September 16, 2014
INVENTOR(S) : Duncan Barclay, William Reeves and Henning Sirringhaus It is certified that error appears in the above-identified patent and that said Letters Patent is hereby corrected as shown below:

Title page 3, Col. 2, line 14 (Other Publications) delete "Bloger" and insert -- Blogger --, therefor.

IN THE CLAIMS:

Col. 18, line 46, Claim 1, after "said print data" delete "print data".

Signed and Sealed this
Sixteenth Day of December, 2014

Michelle K. Lee
*Deputy Director of the United States Patent and Trademark Office*